(12) United States Patent
Schwarz

(10) Patent No.: US 6,409,446 B1
(45) Date of Patent: Jun. 25, 2002

(54) VIBRATION-DAMPING DETACHABLE CONNECTION ARRANGEMENT FOR TWO COMPONENTS WITH A ROTATING BOLT, A RETAINING SPRING AND A VIBRATION-DAMPING RING

(75) Inventor: Helmut Schwarz, Weil der Stadt (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 09/717,159

(22) Filed: Nov. 22, 2000

(30) Foreign Application Priority Data

Nov. 23, 1999 (DE) ..................... 299 20 497 U

(51) Int. Cl.[7] ............................ F16B 21/00; F16B 21/18
(52) U.S. Cl. ..................... 411/552; 411/353; 411/554; 411/999
(58) Field of Search ................... 411/107, 352, 411/353, 551, 552, 553, 554, 999, 970

(56) References Cited

U.S. PATENT DOCUMENTS

| 2,200,702 | A | | 5/1940 | Oddie | |
| 4,308,646 | A | * | 1/1982 | Schenk | 411/554 |
| 4,921,371 | A | | 5/1990 | Boiraeu et al. | |
| 5,011,355 | A | * | 4/1991 | Motoshige | 411/552 |
| 5,688,093 | A | * | 11/1997 | Bowers | 411/552 |

FOREIGN PATENT DOCUMENTS

| CH | 595565 | 2/1978 |
| DE | 900158 | 12/1953 |
| DE | 1938828 | 2/1970 |
| DE | 2404915 | 8/1974 |
| DE | 29603389 | 8/1996 |
| DE | 29716096 | 10/1997 |
| DE | 29716096 | 12/1997 |
| EP | 0791759 | 8/1997 |
| FR | 1448745 | 12/1966 |
| GB | 1517823 | 7/1978 |

* cited by examiner

Primary Examiner—Neill Wilson
(74) Attorney, Agent, or Firm—Greenblum & Bernstein, P.L.C.

(57) ABSTRACT

Connection arrangement for detachable connection of components with aligned openings, includes a bolt, rotatable around its own axis, having tapered toward a free end, and at least two lateral notches, and retaining spring, including at least two spring-loaded ends, where spring-loaded ends are arranged to hook into lateral notches when first and second components are connected. At least lateral notches of bolt are arranged to project through opening of second component. Vibration-damping ring includes peripheral groove to receive edge of opening of first component and ring opening. Bush is located in ring opening to guide bolt. Movable ring, having outer diameter that is smaller than diameter of opening of first component and that is larger than diameter of opening of second component, is arranged on bolt. When first and second components are connected, movable ring is positioned between lower side of vibration-damping ring and upper side of second component.

24 Claims, 3 Drawing Sheets

VIBRATION-DAMPING DETACHABLE CONNECTION ARRANGEMENT FOR TWO COMPONENTS WITH A ROTATING BOLT, A RETAINING SPRING AND A VIBRATION-DAMPING RING

CROSS-REFERENCE TO RELATED APPLICATIONS

The present application claims priority under 35 U.S.C. § 119 of German Patent Application No. 299 20 497.9 filed Nov. 23, 1999, the disclosure of which is expressly incorporated by reference herein in its entirety.

BACKGROUND OF THE INVENTION

1. Field of the Invention

The present invention concerns a vibration-damping detachable connection arrangement for two components with a rotating bolt, a retaining spring and a vibration-damping ring.

2. Discussion of Background Information

Besides permitting quick connections, connection arrangements of this type have the advantage of allowing easy dismantling for repair and maintenance purposes. They are used particularly in aircraft and road vehicles for attaching interior panelling.

A rapid-connection device for connecting two parts is known to the prior art, e.g., from German registered utility patent 297 16 096.6, where a bolt, which has lateral notches and is pointed at its free end, is connected to a first part, and a retaining spring, whose two spring-loaded ends hook into the notches is connected to a second part. The bolt is permanently attached to the first part and the retaining spring is attached to the second part in such a way that it can turn around the axis of the bolt.

In addition, a rapid-connection device for connecting two parts with holes is known to the prior art, e.g., from German registered utility patent 296 033 89.8, which rapid-connection device includes a bolt with notches and a retaining spring. The connection is created by the notches of the bolt being inserted into the spring-loaded ends of the retaining spring, and the connection is released by turning the bolt, e.g., with a screwdriver.

In another development of this connection, a deformable rubber ring is located between the parts and the bolt.

However, with the rapid-connection devices described above, the undesirable vibrations arising in one part are transmitted to the other part either directly or through the rapid-connection device.

SUMMARY OF THE INVENTION

In order to avoid the above-noted drawbacks of the prior art, the instant invention provides a rapid-connection device with a rotating bolt and retaining spring, which allows the damping of the vibrations.

In accordance with the features of the instant invention, a connection arrangement is provided for the detachable connection of two components with openings aligned towards one another. The connection device includes a bolt, which rotates around its own axis, which is pointed towards its free end, and which has two lateral notches, that is in connection with the first component. A retaining spring, which has two spring-loaded ends arranged to hook into the notches in the bolt, is connected with the second component. The part of the bolt with the notches is arranged to project through the opening of the second component. A vibration-damping ring with a peripheral groove is provided, where the edge of the opening of the first component can be located or received, and a bush is located in an opening of the vibration-damping ring to receive and guide the bolt. A movable ring has an outer diameter which is smaller than a diameter of the opening of the first component and which is larger than the diameter of the opening of the second component, is arranged on the bolt, and, when the first and second components are connected via the connection arrangement, movable ring is positioned between a lower side of the vibration-damping ring and an upper side of the second component.

In an alternative embodiment, the connection arrangement for the detachable connection of two components with openings aligned towards one another includes vibration-damping ring with a peripheral groove, which is arranged to receive the edge of the opening of the second component. The first component is positionable above the vibration-damping ring. A bush is located in an opening of the vibration-damping ring to receive and guide the bolt, and a retaining spring on a side of the vibration-damping ring remote from the two components is connected with either the vibration-damping ring or the bush.

Further, a retaining ring is arranged on the bolt between the first component and the vibration-damping ring, and the retaining ring may be made of elastic material. A device forming a stop with reference to the opening of the second component is provided on the side of the vibration-damping ring remote from the two components.

The retaining springs are connected with the vibration-damping ring by embedding, e.g., by vulcanizing or casting in.

It is also noted that the retaining springs can be permanently connected with the bush in the area of the side of the vibration-damping ring remote from the two components by riveting, adhesive bonding, etc.

The retaining springs in the area of the side of the vibration-damping ring remote from the two components are connected with a bush clamping holder, which is arranged to hook over an inner wall of the vibration-damping ring.

Moreover, a stop can be provided on the bolt for retaining the movable ring. The stop may be a lock washer located in a groove of the bolt. When the bolt is turned, the retaining-spring ends can be expanded by the area of the bolt, without recesses, which is located at the side of the recesses.

The bush has an edge, which lies against an upper side of the vibration-damping ring, and either the head of the bolt or the retaining ring can be arranged to lie against the bush edge.

The present invention is directed to a connection arrangement for the detachable connection of a first and second component with openings to be aligned with each other. The connection arrangement includes a bolt, which is rotatable around its own axis, having a taper toward a free end, and at least two lateral notches, where the bolt is adapted for coupling to the first component, and a retaining spring, including at least two spring-loaded ends, adapted for coupling to the second component, where the spring-loaded ends are arranged to hook into the lateral notches when the first and second components are connected. At least the lateral notches of the bolt are arranged to project through the opening of the second component. A vibration-damping ring includes a peripheral groove adapted to receive an edge of the opening of the first component and a ring opening. A bush is located in the ring opening and arranged to receive and guide the bolt. A movable ring, having an outer diameter that is smaller than a diameter of the opening of the first component and that is larger than a diameter of the opening of the second component, is arranged on the bolt. When the first and second components are connected, the movable ring is positioned between a lower side of the vibration-damping ring and an upper side of the second component.

In accordance with a feature of the instant invention, a stop may be arranged on the bolt to retain the movable ring. The stop can include a lock washer located in a groove in the bolt.

According to another feature of the invention, when the bolt is rotated, the retaining-spring ends may be expanded by non-lateral recessed diameter of the bolt, which is located at a side of the lateral recesses.

The bush may include an edge arranged to lie against an upper side of the vibration-damping ring and the bolt can include a bolt head, such that the bolt head is arranged to lie against the bush edge.

The present invention is directed to a connection arrangement for the detachable connection of a first and second component with openings to be aligned with each other. The connection arrangement includes a bolt, which is rotatable around its own axis, having a taper toward a free end, and at least two lateral notches, where the bolt is adapted for coupling to the first component, and a retaining spring, including at least two spring-loaded ends, adapted for coupling to the second component, where the spring-loaded ends are arranged to hook into the lateral notches when the first and second components are connected. At least the lateral notches of the bolt are arranged to project through the opening of the second component. A vibration-damping ring includes a peripheral groove adapted to receive an edge of the opening of the second component and a ring opening, a bush is located in the ring opening and arranged to receive and guide the bolt, and a retaining spring on a side of the vibration-damping ring remote from the first and second components is coupled with one of the vibration-damping ring or the bush.

According to a feature of the present invention, a retaining ring may be arranged on the bolt between the first component and the vibration-damping ring. The retaining ring can include elastic material.

A stop can be arranged on a side of the vibration-damping ring remote from the first and second components. The stop may be arranged adjacent the opening of the second component.

Moreover, the retaining springs can be embedded in the vibration-damping ring. The retaining springs are embedding in the vibration-damping ring by one of vulcanizing or casting in.

The retaining springs may be permanently connected with the bush in an area of a side of the vibration-damping ring remote from the first and second components. The retaining springs can be permanently connected to the bush by riveting or adhesive bonding.

A bush clamping holder may be arranged to hook over an inner wall of the vibration-damping ring. The retaining springs in an area of a side of the vibration-damping ring remote from the components can be coupled to the bush clamping holder.

The present invention is directed to an apparatus for the detachable connection of a first and second component with openings to be aligned with each other. The apparatus includes a bolt, which is rotatable around its own axis, having a taper toward a free end, and at least two lateral notches, where the bolt is adapted to extend through the opening of the first component, and retaining spring, including at least two spring-loaded ends, adapted for coupling to the second component, where the spring-loaded ends are arranged to hook into the lateral notches when the first and second components are connected. At least the lateral notches of the bolt are arranged to project through the opening of the second component. A vibration-damping ring includes a ring opening and a peripheral groove, which is adapted to receive an edge of the opening of one of the first and the second component. A bush is located in the ring opening and arranged to receive and guide the bolt, and a movable ring is arranged on the bolt and positionable either between the vibration-damping ring and the first component or between the vibration-damping ring and the second component.

In accordance with a feature of the invention, the bush may include a bush edge arranged between the vibration-damping ring and the first component. The movable ring may be positioned between the bush edge and the first component. The retaining springs can be coupled to one of the vibration-damping ring or an end of the bush remote from the bush edge.

According to yet another feature of the instant invention, the bush can include a bush edge arranged between the vibration-damping ring and a head of the bolt. The movable ring may be positioned between an end of the vibration-damping ring remote from the bush edge and the second component. The retaining springs are coupled to the second component.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 2:
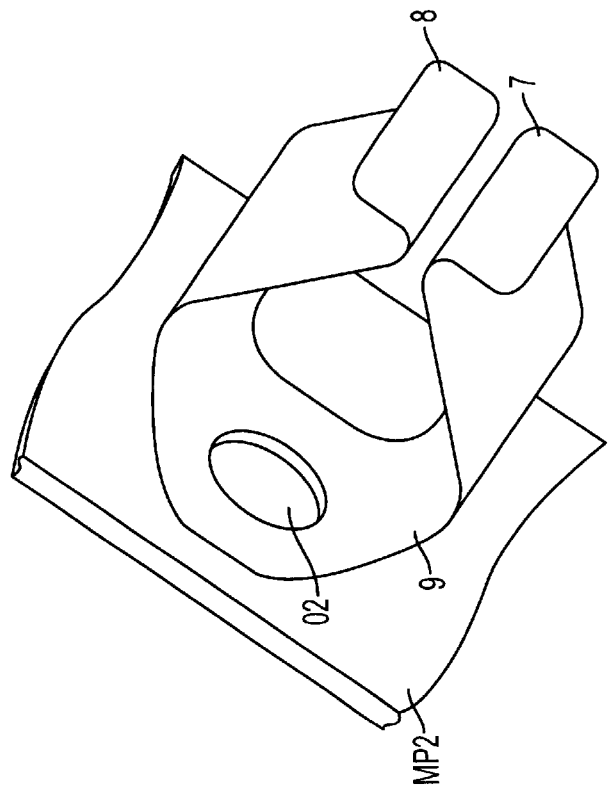
FIG. 2 illustrates a perspective view of the two-arm retaining spring attached to the second component.
Figure 1:
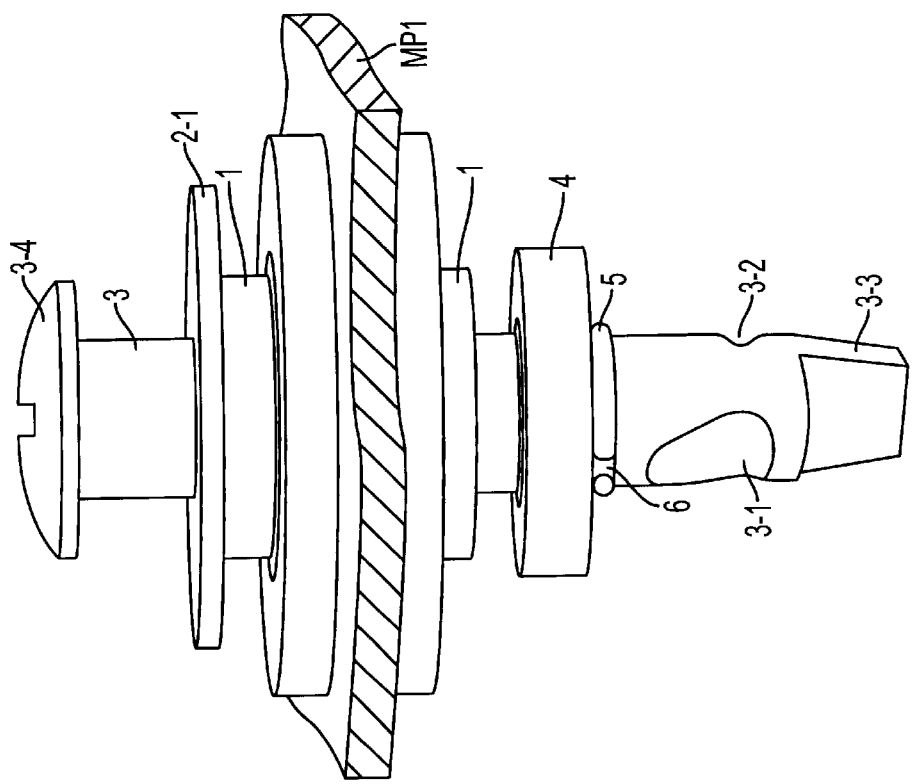
FIG. 1 illustrates a perspective view of the bolt connected with the first component via a vibration-damping ring.
Figure 4:
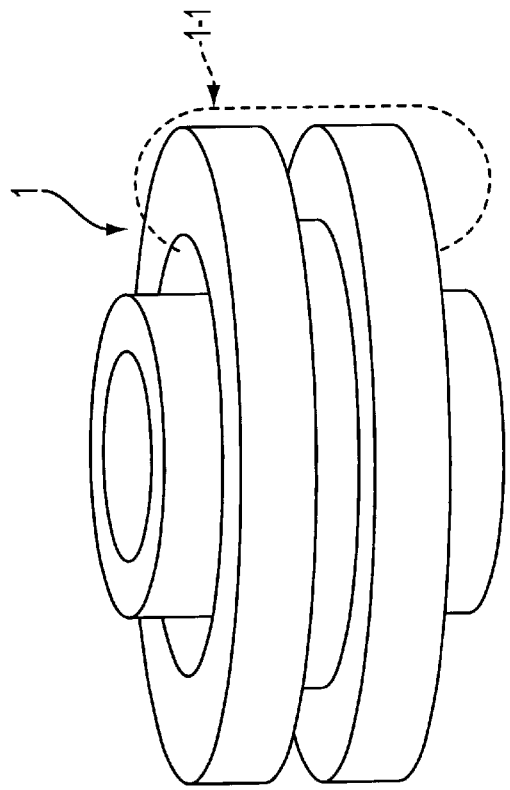
FIG. 4 illustrates a perspective view of the vibration-damping ring.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The same parts shown in FIGS. 1 to 4 have the same designations:

The first component to be connected with the second component MP2 is designated MP1.

For the connection, a hole or opening O1 in the first component MP1 is aligned with a hole or opening O2 in the second component MP2.

A vibration-damping ring 1 (see, also, FIGS. 3 and 4) has a peripheral bead 1-1 with a neck part 1-2 and a head part 1-3. Head part 1-3 includes a groove N, which is arranged to receive opening O1, i.e., the edges of opening O1, of first component MP1.

A bush 2 with a supporting edge 2-1, which lies against a top side of vibration-damping ring 1 is located in a ring opening or central bore. Rotating bolt 3 is guided in bush 2, and passes through opening O1 of first component MP1 and through opening O2 of second component MP2. A ring disk 4 is located movably on bolt 3, such that, when the second component is absent, it can be moved between a lower edge of vibration-damping ring 1 and a lock washer 5, which is located in a bolt groove 6.

Figure 3:
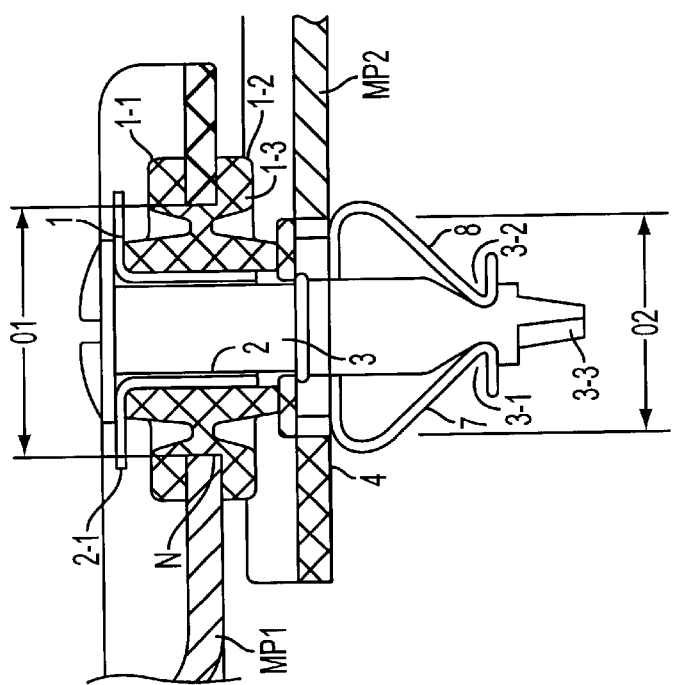
FIG. 3 illustrates a diagrammatic sectional view of all the elements of the connection arrangement.

When components MP1 and MP2, as depicted in FIG. 3, are connected with one another, ring disk 4 is located between, and preferably directly between, the lower edge of vibration-damping ring 1 and lock washer 5. Further, disk 4 permits lateral movement of the connection arrangement on second component MP2.

On the lower part of bolt 3, two locking recesses (or notches) 3-1 and 3-2 are located, which permit the ends of spring arms 7 and 8 to lock into position, thereby connecting components MP1 and MP2. The arrangement of spring 9, e.g., a retaining spring, is separately illustrated in FIG. 2, and is permanently connected, e.g., by riveting, with the lower side of second component MP2 and includes free arms 7 and 8 whose free ends are inclined toward one another. The ends of free arms 7 and 8 are bent slightly outwardly, thereby producing a positive spring-actuated seat in locking recesses 3-1 and 3-2 and enabling the lock to be released.

As illustrated in the Figures, the tip 3-3 of bolt 3 is wedge shaped. Thus, to release the connection, rotating bolt 3 is turned through about 90° degrees using a screwdriver applied to head 3-4. In this manner, the ends of the leaf spring, i.e., free arms 7 and 8, to move apart in order to accommodate the increasing diameter of bolt 3. In this unlocked position, the locking grip of the ends of the leaf spring in lateral recesses 3-1 and 3-2 is released, and component MP1 along with vibration-damping ring 1 and bolt 3 can be pulled out of the opened spring arrangement 9, which is connected to component MP2. As bolt 3 is slightly conical, it can slip out of the expanded retaining spring almost automatically, thereby showing clearly that the connection has been released.

To re-connect components MP1 and MP2 with one another, bolt 3 is pushed through opening O2 of second component MP2 and the narrow side of wedge-shaped tip 3-3 is pushed between the ends of the leaf spring, thereby causing them to move apart until they again lock into locking recesses 3-1 and 3-2.

Through its elasticity, vibration-damping ring 1 also serves to compensate the tolerances of the components being connected. To compensate the tolerances in this way, the connection arrangement known to prior art, i.e., without a vibration-damping ring, made use of additional pressure springs, which are no longer necessary in accordance with the present invention.

Figure 5:
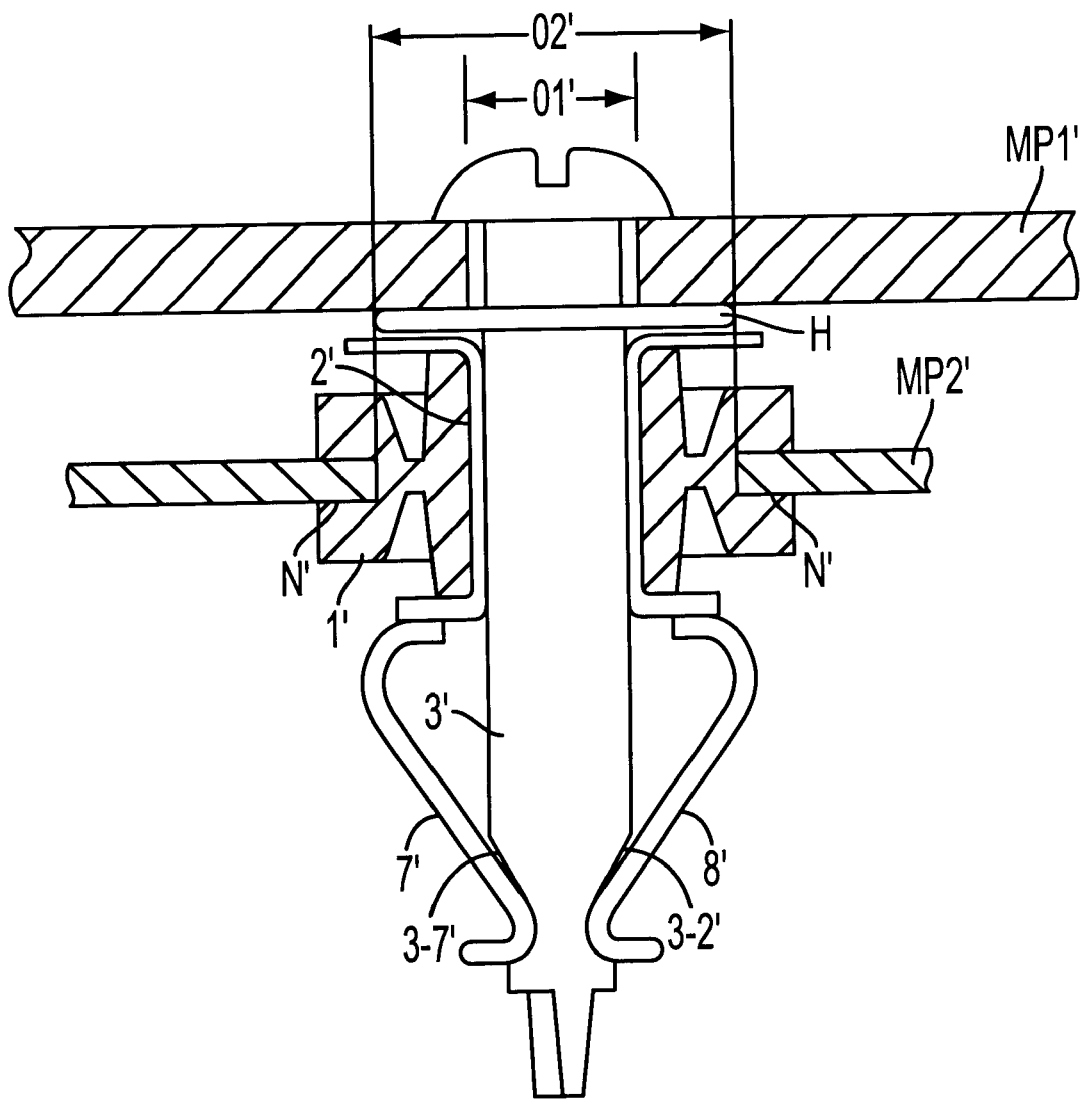
FIG. 5 illustrates a diagrammatic sectional view of another version of the invention.

FIG. 5 illustrates a schematic sectional view of another version of the invention where first component MP1' is arranged above vibration-damping ring 1' and second component MP2' is held, i.e., received and retained, in peripheral groove N' of vibration-damping ring 1'.

Opening O1' of first component MP1', opening O2' of second component MP2', and the ring opening (or central bore) of vibration-damping ring 1' are aligned with one another with reference to a common axis. In ring opening of vibration-damping ring 1', a bush is located, through which, rotating bolt 3' is guided.

Between an upper edge of bush 2' and first component MP1', a retaining ring H of elastic material is attached, which serves to prevent bolt 3' from dropping out of component MP1', i.e., before the two components are connected with one another. Moreover, its resilient material permits compensation of tolerances, e.g., when the components are of differing thicknesses.

The free spring-loaded ends of the retaining (leaf) springs 7' and 8' lock into recesses 3-1' and 3-2' on bolt 3'. The fixed ends of springs 7' and 8' are permanently connected to a lower edge of bush 2', e.g., by riveting, bolting, adhesive bonding. However, the fixed ends may also be clamped in the wall of bush 2', e.g., when upper and lower edges of bush 2' lock over an inner wall of vibration-damping ring 1', and a lower area can have a recess for holding the (fixed) end of spring 7' or 8' (not shown). In addition, it is also possible to embed the fixed ends of springs 7' and 8' in vibration-damping ring 1, e.g., by vulcanizing or casting in.

On a side of vibration-damping ring 1' facing away (i.e., remote) from components MP1' and MP2', a device forming a stop with reference to opening O2' of second component MP2' is provided. This device, e.g., a retaining-spring arrangement, prevents the connection arrangement from being pulled out of the opening O1' when subjected to extreme loads.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A connection arrangement for the detachable connection of a first and second component with openings to be aligned with each other, the connection arrangement comprising:
    a bolt, which is rotatable around its own axis, having a taper toward a free end, and at least two lateral notches, wherein said bolt is adapted for coupling to the first component;
    a retaining spring, comprising at least two spring-loaded ends, adapted for coupling to the second component, wherein said spring-loaded ends are arranged to hook into said lateral notches when the first and second components are connected;
    at least said lateral notches of said bolt are arranged to project through the opening of the second component;

a vibration-damping ring comprising a peripheral groove adapted to receive an edge of the opening of the first component and a ring opening;

a bush being located in said ring opening and arranged to receive and guide said bolt; and a movable ring, having an outer diameter that is smaller than a diameter of the opening of the first component and that is larger than a diameter of the opening of the second component, being arranged on said bolt, wherein, when the first and second components are connected, said movable ring is positioned between a lower side of said vibration-damping ring and an upper side of the second component.

2. The connection arrangement in accordance with claim 1, further comprising a stop arranged on said bolt to retain said movable ring.

3. The connection arrangement in accordance with claim 2, wherein said stop comprises a lock washer located in a groove in said bolt.

4. The connection arrangement in accordance with claim 1, wherein, when said bolt is rotated, said retaining-spring ends are expanded by non-lateral recessed diameter of said bolt, which is located at a side of said lateral recesses.

5. The connection arrangement in accordance with claim 1, wherein said bush comprises an edge arranged to lie against an upper side of said vibration-damping ring and said bolt comprises a bolt head, such that said bolt head is arranged to lie against said bush edge.

6. A connection arrangement for the detachable connection of a first and second component with openings to be aligned with each other, the connection arrangement comprising:

a bolt, which is rotatable around its own axis, having a taper toward a free end, and at least two lateral notches, wherein said bolt is adapted for coupling to the first component;

a retaining spring, comprising at least two spring-loaded ends, adapted for coupling to the second component, wherein said spring-loaded ends are arranged to hook into said lateral notches when the first and second components are connected;

at least said lateral notches of said bolt are arranged to project through the opening of the second component;

a vibration-damping ring comprising a peripheral groove adapted to receive an edge of the opening of the second component and a ring opening;

a bush being located in said ring opening and arranged to receive and guide said bolt; and a retaining spring on a side of said vibration-damping ring remote from the first and second components is coupled with one of said vibration-damping ring or said bush.

7. The connection arrangement in accordance with claim 6, further comprising a retaining ring arranged on said bolt between the first component and said vibration-damping ring.

8. The connection arrangement in accordance with claim 7, wherein said retaining ring comprises elastic material.

9. The connection arrangement in accordance with claim 6, further comprising a stop arranged on a side of said vibration-damping ring remote from the first and second components.

10. The connection arrangement in accordance with claim 9, wherein said stop is arranged adjacent the opening of the second component.

11. The connection arrangement in accordance with claim 6, wherein said retaining springs are embedded in said vibration-damping ring.

12. The connection arrangement in accordance with claim 11, wherein said retaining springs are embedding in said vibration-damping ring by one of vulcanizing or casting in.

13. The connection arrangement in accordance with claim 6, wherein said retaining springs are permanently connected with said bush in an area of a side of said vibration-damping ring remote from the first and second components.

14. The connection arrangement in accordance with claim 13, wherein said retaining springs are permanently connected to said bush by riveting or adhesive bonding.

15. The connection arrangement in accordance with claim 6, further comprising a bush clamping holder arranged to hook over an inner wall of said vibration-damping ring, wherein said retaining springs in an area of a side of said vibration-damping ring remote from the components are coupled to said bush clamping holder.

16. The connection arrangement in accordance with claim 6, wherein, when said bolt is rotated, said retaining-spring ends are expanded by non-lateral recessed diameter of said bolt, which is located at a side of said lateral recesses.

17. The connection arrangement in accordance with claim 6, wherein said bush comprises an edge arranged to lie against an upper side of said vibration-damping ring and said bolt comprises a bolt head, such that said bolt head is arranged to lie against said bush edge.

18. An apparatus for the detachable connection of a first and second component with openings to be aligned with each other, the apparatus comprising:

a bolt, which is rotatable around its own axis, having a taper toward a free end, and at least two lateral notches, wherein said bolt is adapted for extend through the opening of the first component;

a retaining spring, comprising at least two spring-loaded ends, adapted for coupling to the second component, wherein said spring-loaded ends are arranged to hook into said lateral notches when the first and second components are connected;

at least said lateral notches of said bolt are arranged to project through the opening of the second component;

a vibration-damping ring comprising a ring opening and a peripheral groove, which is adapted to receive an edge of the opening of one of the first and the second component;

a bush being located in said ring opening and arranged to receive and guide said bolt; and a movable ring being arranged on said bolt and positionable either between the vibration-damping ring and the first component or between the vibration-damping ring and the second component.

19. The apparatus in accordance with claim 18, wherein said bush comprises a bush edge arranged between the vibration-damping ring and the first component.

20. The apparatus in accordance with claim 19, wherein the movable ring is positioned between said bush edge and the first component.

21. The apparatus in accordance with claim 20, wherein said retaining springs are coupled to one of said vibration-damping ring or an end of said bush remote from said bush edge.

22. The apparatus in accordance with claim 18, wherein said bush comprises a bush edge arranged between the vibration-damping ring and a head of said bolt.

23. The apparatus in accordance with claim 22, wherein the movable ring is positioned between an end of said vibration-damping ring remote from said bush edge and the second component.

24. The apparatus in accordance with claim 23, wherein said retaining springs are coupled to said second component.

* * * * *